United States Patent
Chamberland (12) 
(10) Patent No.: US 6,413,178 B1
(45) Date of Patent: Jul. 2, 2002

(54) REVERSIBLE DRIVEN PULLEY

(75) Inventor: Rene Chamberland, Drummondville (CA)

(73) Assignee: CVTech R & D Inc., Drummondville (CA)

( * ) Notice: Subject to any disclaimer, the term of this patent is extended or adjusted under 35 U.S.C. 154(b) by 0 days.

(21) Appl. No.: 09/687,648

(22) Filed: Oct. 13, 2000

Related U.S. Application Data (63) Continuation of application No. PCT/CA99/00337, filed on Apr. 16, 1999.

(30) Foreign Application Priority Data

Apr. 16, 1998 (CA) .............................................. 2231491

(51) Int. Cl.[7] .......................... F16H 59/00; F16H 63/00
(52) U.S. Cl. .............................. 474/19; 474/17; 474/12
(58) Field of Search ................. 474/19, 8, 10, 474/11–13, 17, 21, 25, 12

(56) References Cited

U.S. PATENT DOCUMENTS

| | | | | |
|---|---|---|---|---|
| 3,722,308 A | * | 3/1973 | Steur | 474/19 |
| 4,173,155 A | * | 11/1979 | Togami et al. | 474/19 |
| 4,378,221 A | * | 3/1983 | Huff et al. | 474/19 |
| 4,523,917 A |   | 6/1985 | Schildt | |

FOREIGN PATENT DOCUMENTS

| | | | |
|---|---|---|---|
| DE | 1117352 | * 11/1961 | .................. 474/19 |
| EP | 222929 | * 5/1987 | ................. 474/196 |
| FR | 2 658 892 | 8/1991 | |
| JP | 63009767 | 1/1988 | |
| JP | 63214567 | 9/1988 | |

* cited by examiner

*Primary Examiner*—David A. Bucci
*Assistant Examiner*—Marcus Charles
(74) *Attorney, Agent, or Firm*—Thomas J. Keefer; Wildman, Harrold, Allen & Dixon (57) ABSTRACT

A continuously variable transmission comprising a main shaft (2), a fixed flange (14) and a movable flange (16), a first cam system comprising a cam plate (22) provided with cam surfaces (24), and corresponding cam followers (28), a second cam system also comprising a cam plate (40), provided with cam surfaces (42) and corresponding cam followers (46). During a normal forward rotation of the driven pulley (10), corresponding to a forward motion of the vehicle, the first cam system is automatically disabled and the position of the movable flange (16) is governed by the second cam system. However, under motor-braking conditions, the first cam system takes over the control and the second cam system is disabled. Similarly, the first cam system governs the position of the moveable flange (16) during normal reverse rotation of the driven pulley (10) and the second cam system takes over the control under motor-braking conditions as the vehicle is traveling rearwards.

9 Claims, 8 Drawing Sheets

Fig-4

REVERSIBLE DRIVEN PULLEY

CROSS REFERENCE TO RELATED APPLICATION

This application claims the priority of Canadian patent application Ser. No. 2,231,491 filed on Apr. 16, 1998.

This application is a continuation of PCT/CA/99/00337 filed on Apr. 16, 1999.

BACKGROUND

Continuously variable transmissions (CVT) are commonly used on a wide range of vehicles, such as small cars or trucks, snowmobiles, golf carts and scooters. They comprise a driving pulley connected to a motor, a driven pulley connected to wheels or a track, and a trapezoidal belt transmitting torque between the driving pulley and the driven pulley. The CVT automatically changes the ratio as required by load and speed conditions, providing an increased torque under high loads at low speed and yet controlling the rotation speed of the motor as the vehicle accelerates. A CVT may be used with all kinds of motors, such as internal combustion engines or electric motors.

The sides of the trapezoidal belt are, on each pulley, gripped between two opposite flanges that are coaxially mounted around a main shaft. Generally, one flange, called "fixed flange", is rigidly connected to one end of the shaft. The other flange, called "movable flange", is free to rotate and slide with reference to a portion of the shaft. At low speed, the winding diameter of the driving pulley is small and the winding diameter of the driven pulley is maximum. As the rotation speed of the driving pulley increases, the movable flange of the driving pulley gets closer to the fixed flange and thus forces the trapezoidal belt to wind on a greater diameter. Since the length of the trapezoidal belt does not significantly changes, the trapezoidal belt exerts a radial force towards the center of the flanges of the driven pulley in addition to the tangential driving force. This radial force constrains the driven pulley to have a smaller winding diameter. Therefore, the movable flange of the driven pulley moves away from the fixed flange until the return force exerted by a spring, usually a torsion spring, counterbalances the radial force exerted by the trapezoidal belt.

Yet, change in the load may also produce a variation of the winding diameter of the driven pulley. More particularly, a greater load induces a greater winding diameter thereof and vice versa. This is caused by a cam system comprises a cam plate having a plurality of symmetrically-disposed cam surfaces. Corresponding cam followers are in engagement with the cam surfaces. The cam followers are usually slider buttons or rollers. The cam plate or the set of cam followers is rigidly connected at the back side of the movable flange and the other of them is rigidly connected to the shaft. The closing effect of the cam system on the belt tension is then somewhat proportional to output torque. The belt tension is high under high loads at low speed, thereby preventing belt slippage. However, it is lower at. high speed to avoid excessive pressure of the belt against the flanges of the pulleys and to maintain a good efficiency. When the rotation speed of the motor decreases, the winding diameter of the driving pulley decreases and the radial force exerted by the trapezoidal belt decreases, thus allowing the driven pulley to have a greater winding diameter as the torsion spring moves the movable flange towards the fixed flange. An example of such a variable speed transmission is disclosed in U.S. Pat. No. 3,286,330.

Many vehicles include a rearward rotation mode, whereby the driving torque from the motor is provided for movement in a direction opposite the normal driving direction. The inverted driving torque is obtained by an appropriate gear train or, on some vehicles, by inverting the rotation of the motor. One drawback of a conventional driven pulley is that: it does not provide an efficient operation under a rearward rotation mode, usually because the cam followers are then no longer in engagement with their respective cam surface. Yet, the torque from the motor is then opposite the torsion spring. As a result, the ratio of the transmission is likely to be initially higher that required, which then unnecessarily increases the load on the motor.

A second and similar drawback occurs under motor braking phases, such as when the vehicle is decelerating or traveling down a hill. A conventional driven pulley is difficult to control under those phases. Generally, the rotation speed of the motor a then becomes essentially a function of the traveling speed of the vehicle, transforming the CVT into substantially a one-speed transmission. This is especially a problem for an electric motor with regenerative capabilities and in which a large portion of the inertia of the vehicle is ought to be transformed back into electrical energy and stored in the batteries. Since the rotation speed varies greatly, the output voltage from the motor also greatly fluctuates under motor braking phases and thus requires the intensive use of a sophisticated voltage regulator.

Further, an electric motor with regenerative capabilities is typically 25% less efficient when used. as a generator than it is when used as a motor. To compensate, the rotation speed of the motor should be higher during the regeneration than it is when the motor is used to drive the vehicle.

In JP-A63009767, there is disclosed a torque cam device designed to prevent the slippage between a single set of cam rollers and two opposite annular cam plates. The device comprises a support for supporting the cam rollers between the respective cam surfaces of the annular cam plates. The support is maintained in a central position between both cam plates by means of compression springs. The device is capable of working under a reverse torque condition but the ratio will tend to increase when such condition occurs.

In JP-A-63214567, there is disclosed a torque cam device used to. prevent the occurrence of an excessive thrust force during normal drive operation. A first cam surface is formed in one among the input and output members and a second cam member so that they are inclined in parallel with each other. Rollers are clamped between both cam surfaces by a compression spring.

In U.S. Pat. No. 4,523,917, there is disclosed a driving pulley provided with two sets of cams which face each other. The angle of the cams is different between the two sets. This pulley uses one of the sets of cams to generate a large gripping force in function of the torque between the minimum and an intermediary ratio. Then, between the intermediary ratio and the maximum ratio, the second set of cams is used. The cams of the second set have a steeper angle so that a smaller gripping force in generated in function of the torque.

SUMMARY

The object of the present invention is to provide an improved driven pulley which can suitably and efficiently operate in both forward and rearward directions to regulate the rotation speed, thereby resolving the above-identified drawbacks.

More particularly, the present invention relates to a driven pulley for use in a continuously variable transmission, the driven pulley being coaxially mountable around a main shaft and comprising:

a first flange having a conical wall on one side thereof;

a second flange coaxial with the first flange and having a conical wall which faces the conical wall of the first flange to form a belt-receiving groove in which a belt is to be partially wound, the second flange being at least axially movable with reference to the first flange;

a first annular cam plate comprising at least two inclined first cam surfaces that are substantially identical and symmetrically-disposed thereon;

a set of at least two first cam followers, each first cam follower being in engagement with a respective one of the first cam surfaces;

a first radial support coaxial with the first and the second flange, the first support being axially movable and pivotable with reference to the first( flange;

a second cam plate comprising at least two inclined second cam surfaces, substantially identical and symmetrically-disposed;

a second radial support coaxial with the first and the second flange, the second support being rigidly connectable to the main shaft;

a first spring set between the second flange and the first support; and a second spring set between the first support and the second support;

the driven pulley being characterized in that:

the second cam surfaces of the second annular cam plate have an inverted inclination with reference to the first cam surfaces; and the driven pulley further comprises a set of at least two second cam followers, each second cam follower being in engagement with a respective one of the second cam surfaces;

whereby one among the first cam plate and the set of first cam followers is mounted on the second flange and the other is mounted on the first support, and whereby one among the second cam plate and the set of second cam followers is mounted on the first support and the other is mounted on the second radial support.

A non restrictive description of the preferred embodiments is given hereinafter with reference to the appended figures.

IDENTIFICATION OF THE COMPONENTS

The following is a list of the reference numerals, along with the names of the corresponding components, that are used in the appended figures and in the description.

10 driven pulley
12 main shaft
14 fixed flange (first flange)
16 movable flange (second flange)
18 belt-receiving groove
20 bushing
22 first cam plate
24 first cam surfaces
26 first end walls
28 first cam followers
30 first radial support
32 radially-extending arms
34 bushing
36 first spring
40 second cam plate
42 second cam surfaces
44 second end walls
46 second cam followers
48 second spring
50 second radial support

DESCRIPTION

Overview

The driven pulley (10) is to be used in a continuously variable transmission (CVT). The CVT comprises a driving pulley (not shown), the driven pulley (10) and a trapezoidal belt (not shown) to transmit the torque between them. Generally, the driving pulley is connected to a motor (not shown) while the driven pulley (10) is mechanically connected to the wheels or tracks (not shown) of the vehicle. A CVT is commonly used on vehicles, such as small cars or trucks, snowmobiles, golf carts and scooters. It may also be used in machines which are not vehicles. The CVT is designed to automatically change the transmission ratio as required by load and speed conditions, providing an increased torque under high loads at low speed and yet controlling the rotation speed of the motor as the vehicle accelerates.

Figure 1:
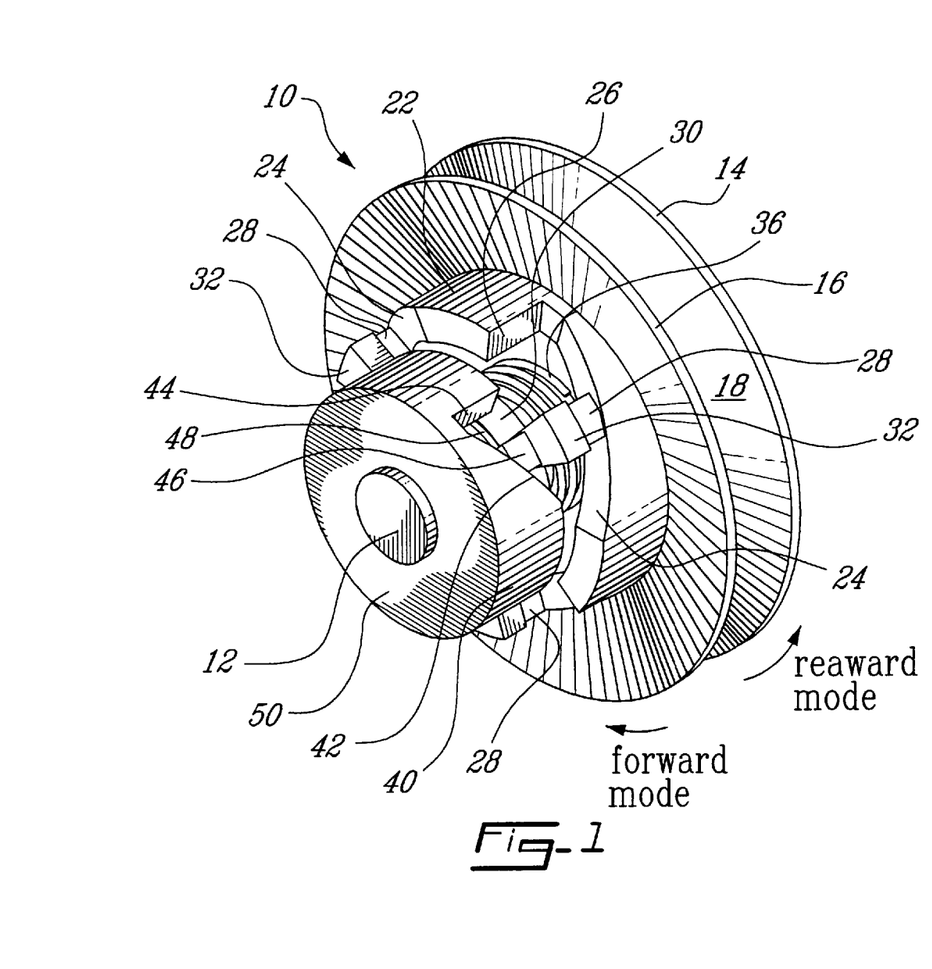
FIG. 1 is a perspective view of a driven pulley, according to a first possible embodiment of the present invention, shown in a neutral position.
Figure 7:
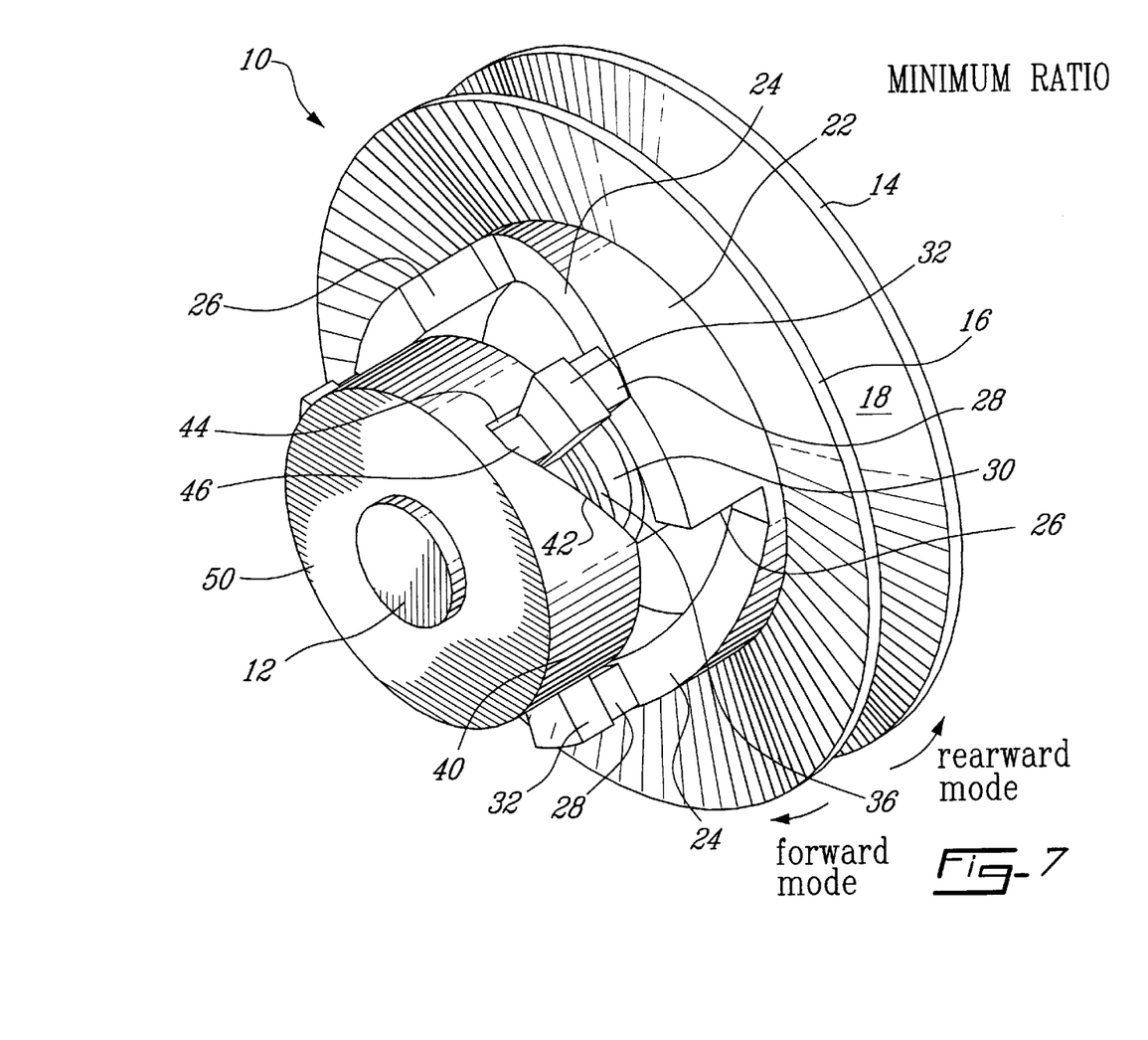
FIG. 7 is a view similar to FIG. 1, showing the minimum ratio position that the driven pulley has under a normal phase in the rearward rotation mode or a motor braking phase in the forward rotation mode.
Figures 8, 9:
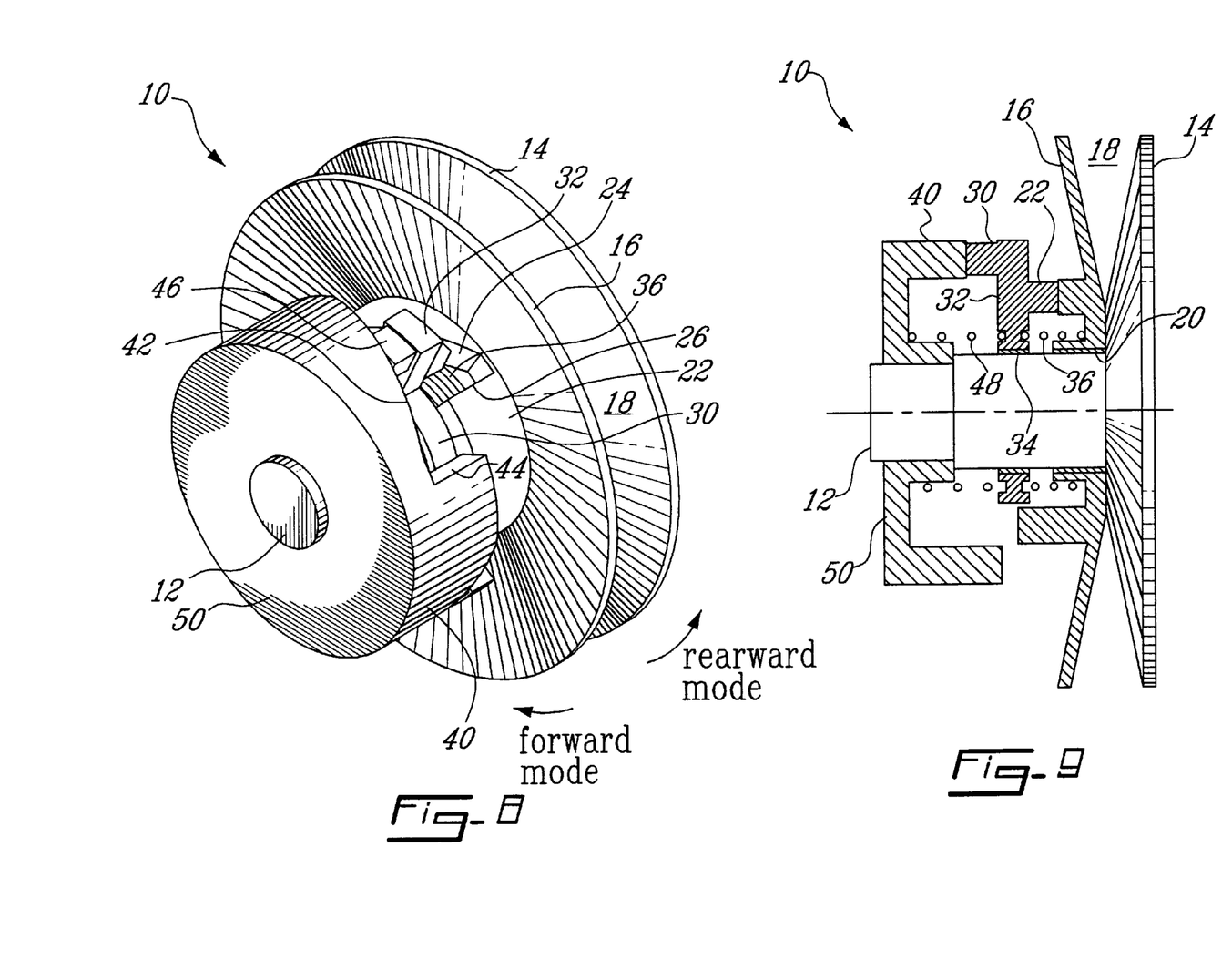
FIG. 8 is a perspective view of a driven pulley, according to a second possible embodiment of the present invention, shown in a neutral position.
FIG. 9 is a longitudinal cross-sectional view of the driven pulley of FIG. 8.
Figure 10:
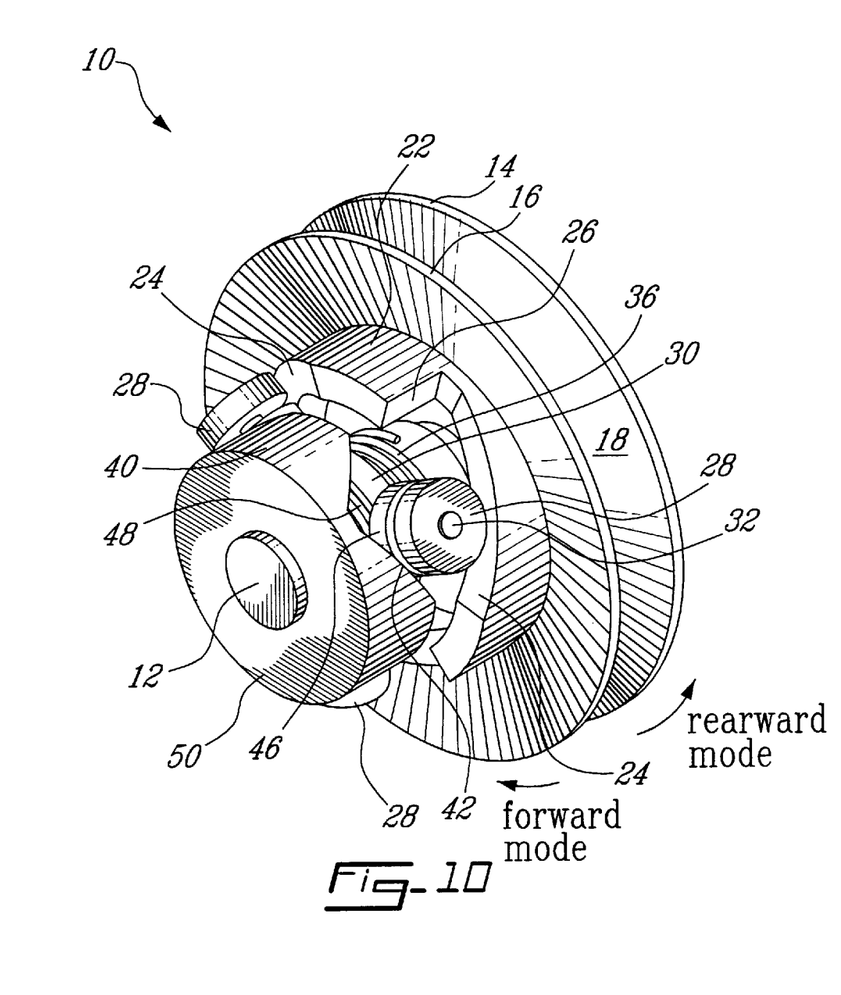
FIG. 10 is a perspective view of a driven pulley, according to a third possible embodiment of the present invention, shown in a neutral position.
Figure 11:
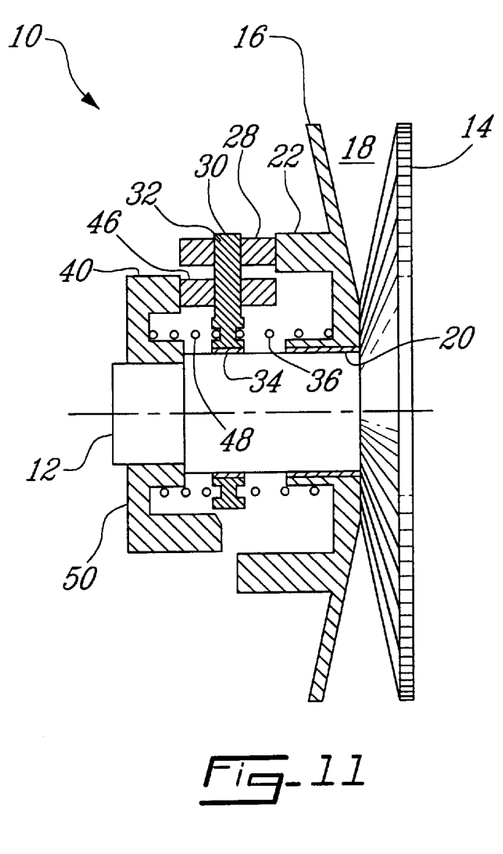
FIG. 11 is a longitudinal cross-sectional view of the driven pulley of FIG. 10.

FIGS. 1, 7 and 9 respectively show a first, second and third possible embodiment of a driven pulley (10) according to the present invention. Many other embodiments are also possible as well.

Operation Modes and Phases

The driven pulley (10) has three basic operation modes, namely a neutral mode, a forward rotation mode and a rearward rotation mode. These modes refer to the overall rotation of the driven pulley (10) and therefore to the basic operation modes of a vehicle, namely forward, neutral and reverse.

The neutral mode of the driven pulley (10) is when no force is applied on the belt. It is generally occurring only when the vehicle is not in motion.

The forward rotation mode of the driven pulley (10) corresponds to the forward motion of the vehicle, while the rearward rotation mode corresponds to the rearward motion of the vehicle. In either the forward rotation mode or the rearward rotation mode, the driven pulley (10) has three basic phases, namely a normal phase, a motor-braking phase and a transitional phase.

The normal phase is when the driving torque is coming from the driving pulley of the CVT and through the belt. The motor of the vehicle then provides the power to move the vehicle forwards or rearwards. The motor-braking phase occurs when the direction of the torque is inverted, which means that the torque is applied from the driven pulley (10) to the driving pulley. At that point, no driving power is coming from the motor. The vehicle then decelerates or if it goes down a steep hill, the motor braking at least reduces the acceleration thereof. If the vehicle is equipped with an electric motor with regenerative capabilities, a motor-braking phase allows a large portion of the inertia of the vehicle can be transformed back into electrical power to be stored in the batteries.

The transitional phase is when the driven pulley (10) shifts between the two other phases and is usually very short. It could be longer during some particular circumstances, such as when the vehicle travels down a very smooth hill, keeping the speed very steady without any driving power from the engine or motor. The tendency to remain in the transitional phase also depends on the actual design parameters of the driven pulley (10), provided that some designs may be less stable and cause almost instantaneous shifts between the normal and motor-braking phases.

Basic Elements

As shown in the figures, the driven pulley (10) is located around a main shaft (12). The shaft (12) can be supplied with the driven pulley (10), making it possible to install or remove the driven pulley (10) as a complete unit. It can also be directly assembled on the extension of another shaft of the vehicle.

The driven pulley (10) comprises two conical flanges (14,16) that are mounted around the main shaft (12) and which are opposite each other. Each of the flanges (14,16) has an inner conical wall facing the other and which defines a V-shaped belt-receiving groove (18) receiving the trapezoidal belt. The belt is wound around about half of the driven pulley (10) and the sides thereof are gripped between the two conical walls.

The first flange (14), also called "fixed flange", is usually rigidly connected to the shaft (12) or at least prevented from rotating with reference to the shaft (12) by means of a linear bearing or the like (not shown). The second flange (16), also called "movable flange", is free to rotate and slide with reference to the shaft (12). A bushing (20), or the like, is provided to facilitate the movements of the movable flange (16).

First Cam System and First Radial Support

The first cam system comprises a first cam plate (22). In FIGS. 1 to 11, the first cam plate (22) is rigidly connected to the movable flange (16), more precisely to the side of movable flange (16) that is opposite the corresponding conical wall. The first cam plate (22) is preferably a hollow annular element having two or more inclined cam surfaces (24). These first cam surfaces (24) are preferably three in number. The first cam surfaces (24, are substantially identical and symmetrically disposed. They are curved since they are beveled segments of the first cam plate (22). The bottom end of each first cam surface (24) merges with a corresponding end wall (26).

First cam followers (28) are provided in a same number than that of the first cam surfaces (24). They are each in engagement with a respective first cam surface (24). The first cam followers (28) are generally slider buttons, such as in FIGS. 1 to 9, 12 and 13, or rollers, such as in FIGS. 10 and 11. A driven pulley (10) may also have a combination of various kinds of cam followers.

Slider buttons are made of low friction material and the first cam surfaces (24) are smooth to facilitate the sliding and reduce the hysteresis of the system. Yet, the slider buttons are preferably beveled so that the contact surface thereof be substantially parallel to their respective cam surface (24).

In FIGS. 1 to 11, the first cam followers (28) are borne by a first radial support (30) that is operatively mounted on the shaft (12), which means that it may slide or pivot freely around the shaft (12). The first radial support (30) preferably comprises radially-extending arms (32), each bearing a respective first cam follower (28) on the side which faces the first cam surfaces (24). Alternatively, the first radial support (30) may be in the form of a closed and radially-projecting surface.

Figure 2:
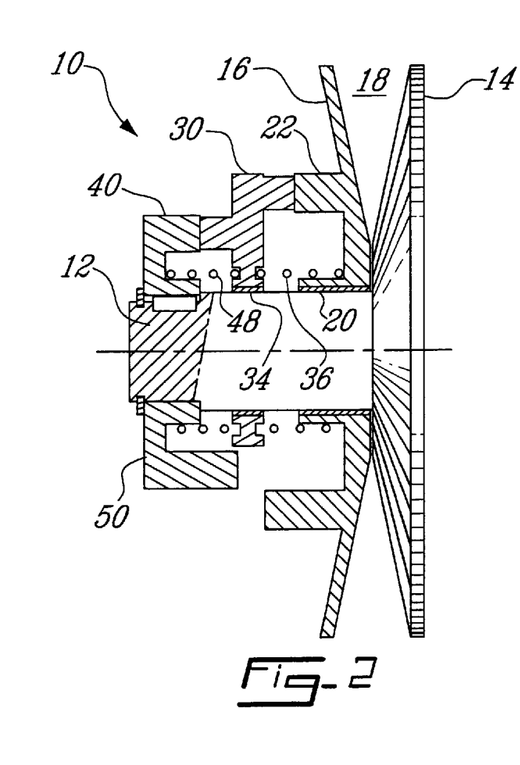
FIG. 2 is a longitudinal cross-sectional view of the driven pulley of FIG. 1.
Figure 12:
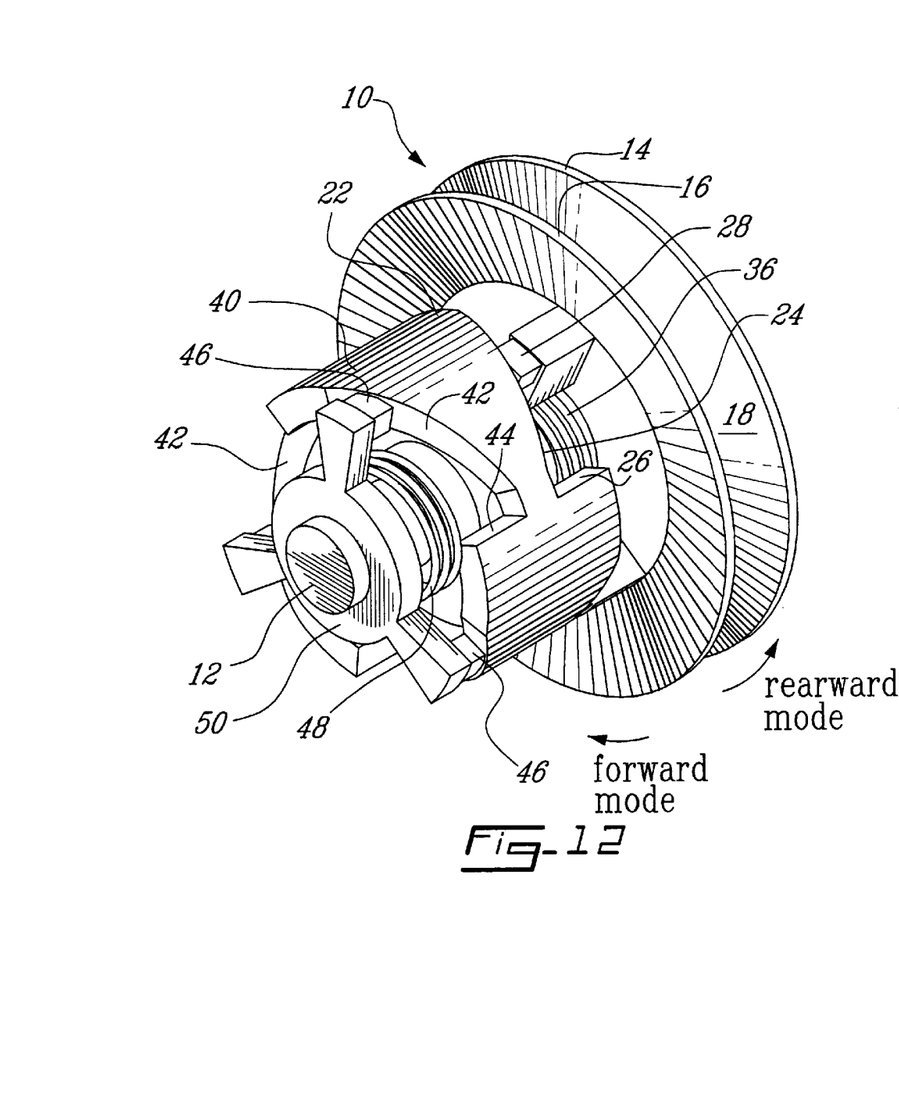
FIG. 12 is a perspective view of a driven pulley, according to a fourth possible embodiment of the present invention, shown in a neutral position.
Figure 13:
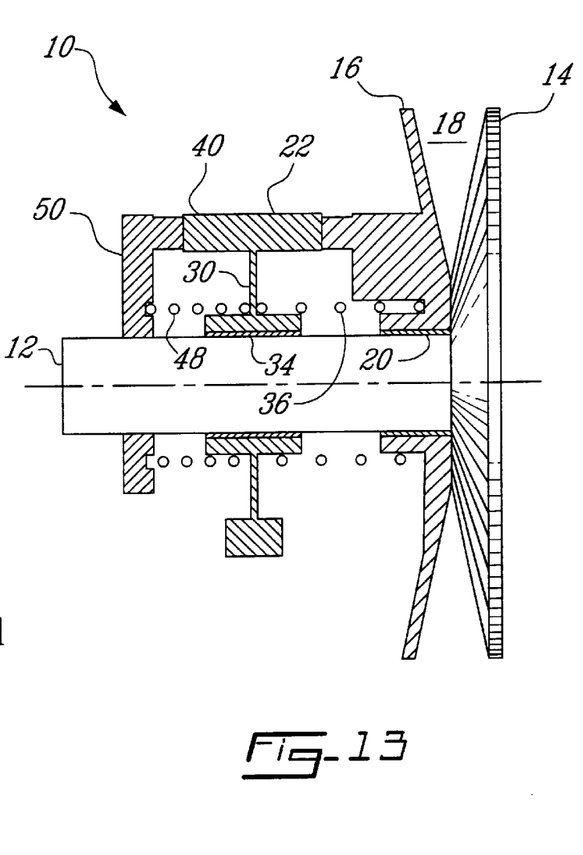
FIG. 13 is a longitudinal cross-sectional view of the driven pulley of FIG. 12.

As shown in FIG. 2, the first radial support (30) is slidably and pivotally connected to the shaft (12) by means of a bushing (34). FIGS. 12 and 13 show another possible embodiment, where the set of first cam followers (28) is rigidly connected to the movable flange (16) and the first cam plate (22) is rigidly connected to the first radial support (30). Another possibility (not shown) is to provide the first radial support (30) in the form of a ring that is set between the first (22) and the second cam plate (40).

The first cam followers (28) are biased against their respective first cam surfaces (24). Preferably, this is achieved by means of a first helicoidal torsion spring (36) coaxially mounted around the shaft (12). The ends of the first spring (36) abut in corresponding recesses inside the movable flange (16) and the first radial support (30). The first spring (36) then biases the first cam followers (28) away from the corresponding first end walls (26). A compression spring or another biasing arrangement can be used as well.

Second Cam System and Second Radial Support

The driven pulley (10) is further provided with a second cam system. The second cam system comprises a second cam plate (40). In FIGS. 1 to 11, the second cam plate (40) is rigidly connected to the first radial support (30). The second cam plate (40) is also preferably in the form of a hollow annular element having two or more inclined cam surfaces (42). These second cam surfaces (42) are preferably three in number.

In FIGS. 1 to 7, 10 and 11, the internal diameter of the first cam plate (22) is slightly larger than the external diameter of the second cam plate (40). This allows a more shallow design so that the length of the driven pulley (10) is reduced to a minimum while preventing both cam plates (22,40) from interfering. FIGS. 8 and 9 show an alternative embodiment, where the internal diameter of the second cam plate (40) is slightly larger than the external diameter of the first cam plate (22). Further, as shown in FIGS. 12 and 13, the driven pulley (10) may be designed to have cam plates (22,40) with the smallest possible diameter. In this case, the length of the driven pulley (10) is increased to position the first (22) and the second cam plates (40) according to a minimal and substantially identical diameter.

Like the first cam surfaces (24), the second cam surfaces (42) are substantially identical and symmetrically disposed. They are curved since they are beveled segments of the second cam plate (40). Their inclination is inverted with reference to the first cam surfaces (24). However, the angle or shape of the second cam surfaces (42) need not to be identical to that of the first cam surfaces (24).

The bottom end of each second cam surface (42), which is the end opposite the movable flange (16), merges with a corresponding end wall (44).

Second cam followers (46) are provided in a same number than that of the second cam surfaces (42). They are each in engagement with a respective second cam surface (42) and are similar, if not identical, to the first cam followers (28).

The driven pulley (10) is further provided with a second radial support (50) that is rigidly connected to the shaft (12). The expression "rigidly connected" in this case means that the second radial support (50) can transfer torque from or to the shaft (12) and be used as a fixed point to push the movable flange (16) towards the fixed flange (14). A linear movement towards the movable flange (16) is still possible if the outer movement is restricted and if the shaft (12) and the second radial support (50) are fixed in rotation.

The second radial support (50) may comprise radially-extending arms or be in the form of a closed and radially-projecting surface. In FIGS. 1 to 11, the second cam followers (46) are borne by the first radial support (30) and the second cam plate (40) is rigidly connected to the second radial support (50). It is the opposite in FIGS. 12 and 13.

The second cam followers (46) are biased against their respective second cam surfaces (42). In the illustrated embodiments, this is achieved by means of a second helicoidal torsion spring (48) mounted around the shaft (12). The ends of the second spring (48) abut in corresponding recesses inside the first radial support (30) and the second radial support (50). The first (36) and the second spring (48) thus work in opposite directions. However, depending on the design, the two springs (36,48) are not necessarily identical. Each may have its own rate and initial load. A compression spring or another biasing arrangement can be used as well.

Neutral Mode

Figure 3:
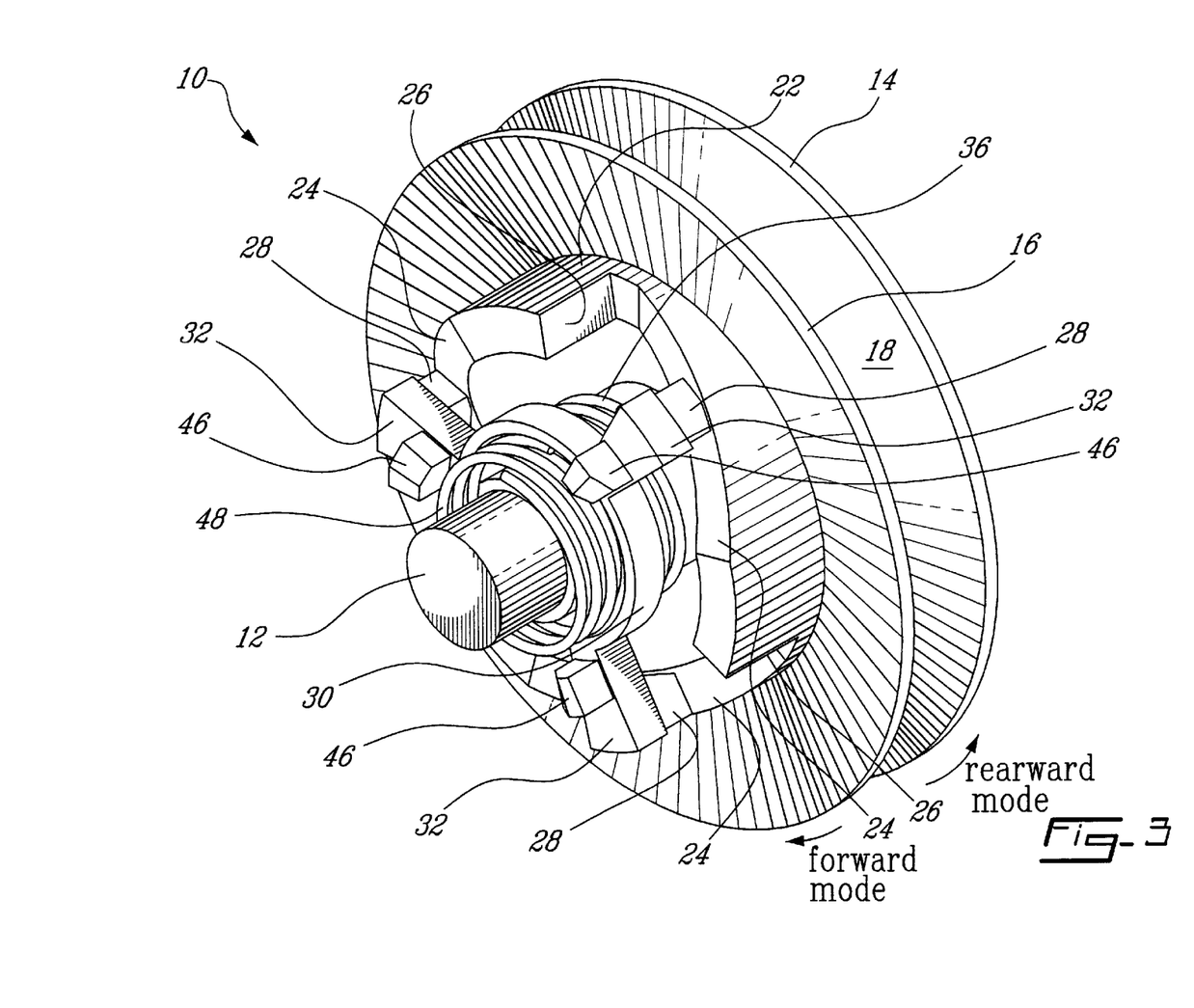
FIG. 3 is a view similar to FIG. 1, showing the driven pulley without the second radial support and the second cam plate.

FIGS. 1 to 3 show the driven pulley (10) in the neutral mode, which is, as aforesaid, the operation mode whenever the vehicle is not in motion. An equilibrium is then reached between both cam systems. The first radial support (30) is set at a position which allows the cam followers (28,46) to be about the middle of their respective cam surfaces (24,42). FIG. 2 shows that the central part of the movable flange (16) is against the central part of the fixed flange (14) at the neutral position, thereby allowing the driven pulley (10) to have a maximum winding diameter. This maximum winding diameter will provide the minimum ratio and therefore the maximum torque output when the vehicle will accelerate.

Forward Rotation Mode a) Normal Phase

Figure 4:
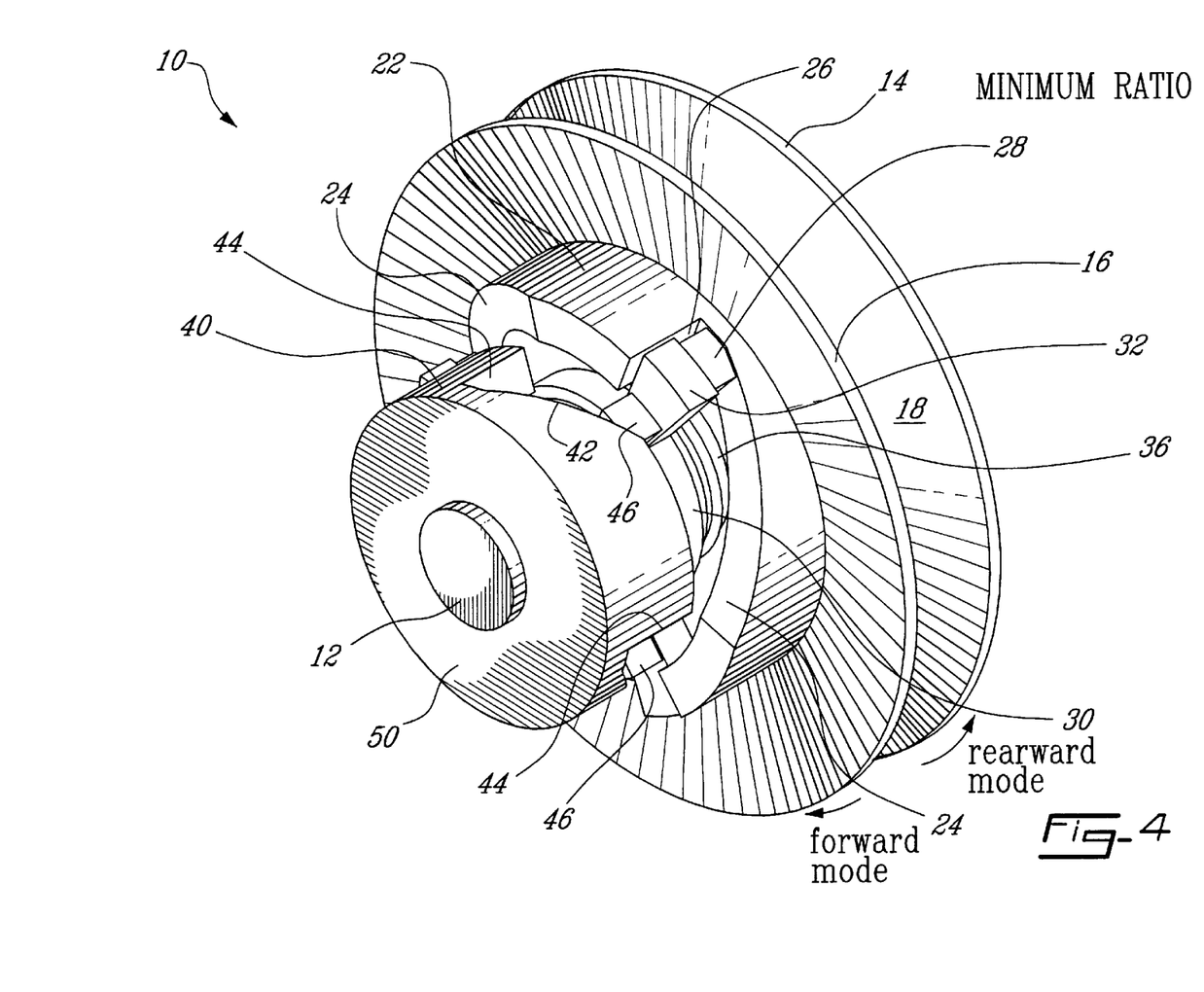
FIG. 4 is a view similar to FIG. 1, showing the minimum ratio position that the driven pulley has under a normal phase in the forward rotation mode or a motor braking phase in the rearward rotation mode.

FIG. 4 shows where the elements of the driven pulley (10) illustrated in FIG. 1 would be during the normal phase in the forward rotation mode. As aforesaid, a normal phase is when the driving torque is coming from the driving pulley of the CVT and through the belt. The driven pulley (10) is illustrated at a minimum ratio, as it would be the case during the initial acceleration of the vehicle. The forward rotation direction is marked by a corresponding arrow. A torque is then sent to the shaft (12). Generally, about half of the torque goes through the fixed flange (14) and the other half goes through the movable flange (16). Because the first cam surfaces (24) converge in the rearward direction, also indicated by a corresponding arrow, the first cam followers (28) are urged towards the bottom of the first cam surfaces (24) and abut against their corresponding end walls (26) as soon as the torque applied to the movable flange (16) is greater than the force exerted by the first spring (36). The short initial transitional phase then ends and the normal phase begins, with the first cam system no longer contributing to the behavior of the driven pulley (10).

Simultaneously, during the initial transitional phase, the second cam followers (46) are moved towards the respective ends of the second cam surfaces (42) that are opposite the second end walls (44). This is clearly visible in FIG. 4.

Once the vehicle gains speed, the winding diameter of the driving pulley increases, and as a result, the belt is urged towards the center of the driven pulley and applies a radial force on the conical walls of flanges (14,16). This radial force generates an axial reaction that is parallel to the shaft (12) to urge the movable flange (16) away form the fixed flange (14). It is counterbalanced by the force exerted by the second spring (48) and by the combined axial reaction of the driving force that is applied on the inclined second cam surfaces (42) by the second cam followers (46), and the axial reaction of the torsion force exerted by the second spring (48) thereon. However, there will be a point where the axial reaction from the radial force applied by the belt is greater than the other forces, forcing the movable flange (16) to move away from the fixed flange (14). The winding diameter of the driven pulley (10) then decreases, which in turn increases the ratio of the CVT.

Figures 5, 6:
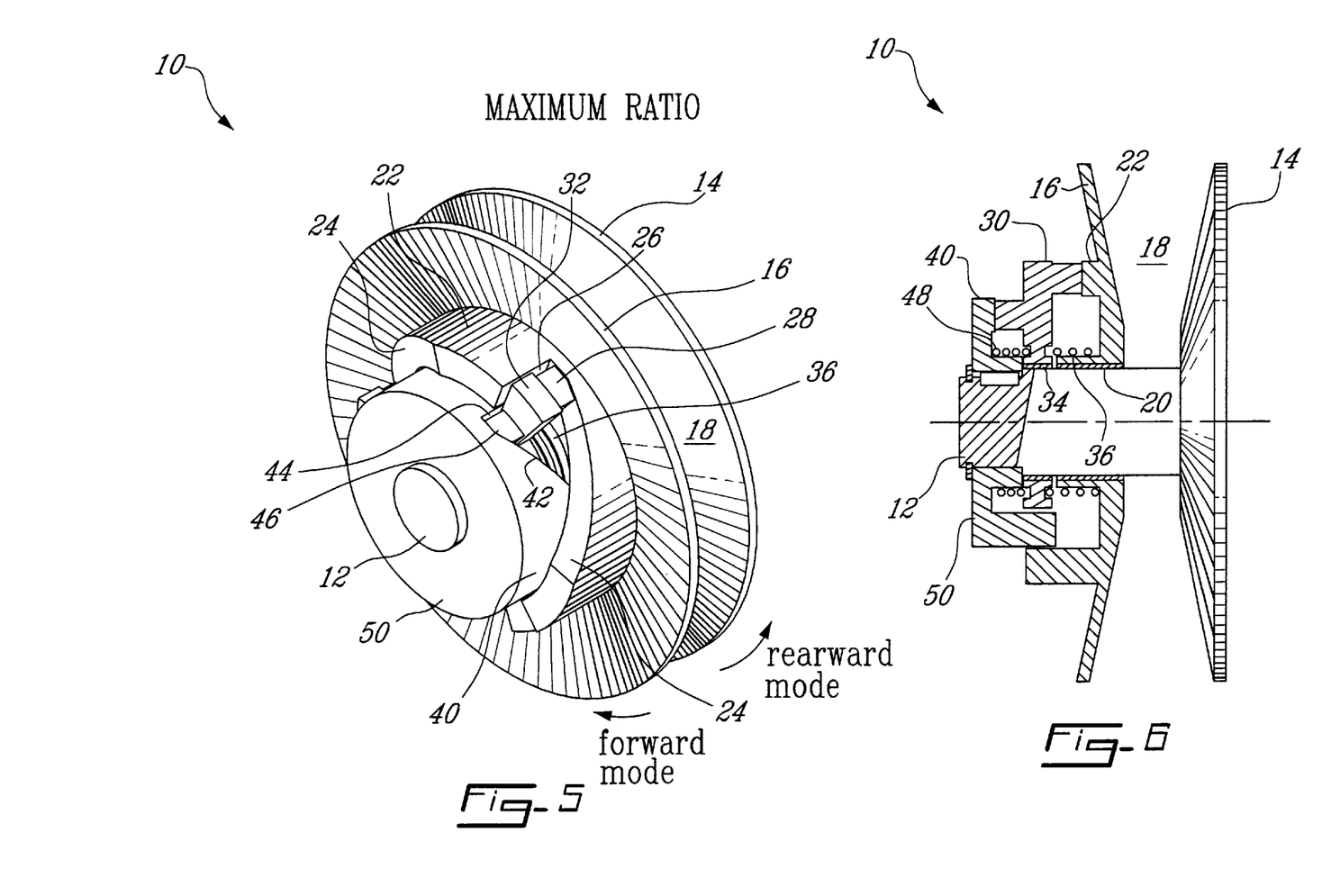
FIG. 5 is a view similar to FIG. 4, showing the maximum ratio position of the driven pulley under the normal phase in the forward rotation mode or the motor braking phase in the rearward rotation mode.
FIG. 6 is a longitudinal cross-sectional view of the driven pulley of FIG. 5.

When the movable-flange (16) moves away from the fixed flange (14), there is generally a slight rotation of the movable flange (16) with reference to the shaft (12) and the fixed flange (14). With all elements still remaining in full engagement, the movable flange (16) pivots in the rearward direction with reference to the shaft (12) and the fixed flange (14). This can continue until the second cam followers (46) reach their respective second end wall (44), as illustrated in FIG. 5. The CVT is then at its maximum ratio. FIG. 6 shows the maximum distance between the fixed flange (14) and the movable flange (16). It should be mentioned that the relative rotation of the movable flange (16) with reference to the shaft (12) and to the fixed flange (14) is possible because of the relatively high rotation speed, the inherent vibrations of the driven pulley (10) and the shearing in the belt.

b) Motor-braking Phase

When the motor stops providing a driving torque and its rotation speed decreases, the tangential driving force exerted by the belt on the flanges (14,16) of the driven pulley (10) disappears since the winding diameter of the driving pulley is proportional to the rotation speed. There is no longer a corresponding axial reaction that biases the movable flange (16) towards the fixed flange (14). The only biasing force is generated by the second spring (48). At that point, a transitional phase begins.

Because of the inertia of the vehicle, there will be a moment where the shaft (12) proportionally rotates faster than the motor and thus the driving pulley of the CVT. As a result, the driving pulley offers a resistance to the rotation. A driving force coming from the driven pulley (10) is applied on the driving pulley through the belt, the driving pulley then becoming "driven". As aforesaid, the second spring (48) generates a return force that urges the movable flange (16) towards the fixed flange (14). As soon as the gripping force is sufficient, the resistance offered by the driving pulley is transferred to the belt and the rotation of the movable flange (16) is slowed down with reference to that of the other elements of the driven pulley (10). The second cam followers (46) are then moved towards their respective second end wall (44) and the first cam system comes into action. The second cam system becomes temporarily ineffective when the second cam followers (46) are against the second end walls (44). During this transitional phase, the distance between the fixed flange (14) and the movable flange (16) does not substantially change, since as the second cam followers (46) move down the second cam surfaces (42), the first cam followers (28) move up the first cam surfaces (24) proportionally. The motor-braking phase begins thereafter.

FIG. 7 shows how the driven pulley (10) is configured during a motor-braking phase in a forward rotation mode. It should be mentioned that it is the same configuration than the normal phase of the rearward rotation mode. The driven pulley (10) is illustrated in a minimum ratio, which corresponds to the final moments of the motor-braking phase when the vehicle is in the forward rotation mode, the vehicle being almost stopped at that moment. One can clearly see that the first cam followers (28) went from a position down the first cam surfaces (24) to the illustrated final position. Initially, as the traveling speed of the decelerating vehicle is high, the winding diameter of the driven pulley (10) is small. The angle of the first cam surfaces (24) allows the closing force to be proportional to the resistance of movement of the driving pulley, itself coming from the resistance of movement from the motor. If the resistance increases, the movable flange (16) is biased towards the fixed flange (14) to increase the winding diameter. This also increases the tangential speed of the belt and therefore the rotation speed of the driving pulley of the CVT. As the rotation speed of the driving pulley increases, its winding diameter also increases. An equilibrium is eventually reached between both pulleys. Thereafter, as the speed of the decelerating vehicle decreases, the rotation speed of the driving pulley also decreases and its winding diameter decreases, allowing in its turn-the winding diameter of the driven pulley (10) to increase. The objective is to obtain a good equilibrium between the driving pulley and the driven pulley (10) so that the rotation speed of the motor is substantially constant during a motor-braking phase.

Rearward Rotation Mode a) Normal Phase

The normal phase of the rearward rotation mode is identical to the normal phase of the forward rotation mode, except that the first cam system is used instead of the second cam system.

Because the second cam surfaces (42) of the illustrated embodiments are oriented in the forward direction, the second cam followers (46) are urged towards the bottom of the second cam surfaces (42) and abut against their corresponding end walls (44) as soon as the torque applied to the movable flange (16) is greater than the force of the second spring (48). The short initial transitional phase then ends and the normal phase begins, with the second cam system no longer contributing to the behavior of the driven pulley (10).

Simultaneously, during the initial transitional phase, the first cam followers (28) are moved toward the respective ends of the first cam surfaces (24) that are opposite the first end walls (26). This is clearly visible in FIG. 7.

Once the vehicle gains speed, the winding diameter of the driving pulley of the CVT increases, and as a result, the radial force that the belt applies on the conical walls of flanges (14,16) also increases. This radial force generates an axial reaction that is parallel to the shaft (12). It is counterbalanced by the force exerted by the first spring (36) and by the combined axial reaction of the driving force, that is applied on the inclined first cam surfaces (24) by the first cam followers (28), and the axial reaction of the torsion force exerted by the first spring (36) thereon. However, there will be a point where the axial reaction from the radial force is greater than the other forces, forcing the movable flange (16) to move away from the fixed flange (14). The winding diameter of the driven pulley (10) then decreases, which in turn increases the ratio of the CVT.

When the movable flange (16) moves away from the fixed flange (14), there is a slight rotation of the movable flange (16) with reference to the shaft (12) and the fixed flange (14). With all elements remaining in full engagement, the movable flange (16) pivots in the forward direction with reference to the shaft (12) and the fixed flange (14). This can continue until the first cam followers (28) reach their respective first end wall (26).

b) Motor-braking Phase

A motor-braking phase in the rearward rotation mode would most probably not be experienced very often since most vehicles are generally not driven very fast in the rearward direction. Nevertheless, motor braking is possible with the driven pulley (10) according to the present invention.

The operation of the driven pulley (10) during the motor-braking phase in the rearward direction is very similar to that of the motor-braking phase in the forward direction, except that the second cam system is used. What happens is that the resistance offered by the motor is transmitted to the driving pulley and then to the belt. The rotation of the movable flange (16) of the driven pulley (10) is slowed down with reference to that of the other elements of the driven pulley (10). The first cam followers (28) are then moved toward their respective first end wall (26) and the second cam system comes into action. The first cam system becomes ineffective when the first cam followers (28) are against the first end walls (26). During this transitional phase, the distance between the fixed flange (14) and the movable flange (16) does not substantially change since as the first cam followers (28) move down the first cam surfaces (24), the second cam followers (46) move up the second cam surfaces (42) proportionally. The motor-braking phase begins thereafter.

FIGS. 4 and 5 show how the driven pulley (10) would be configured during the motor-braking phase in the rearward rotation mode. It should be mentioned that it is the same configuration than the normal phase of the forward rotation mode. In FIG. 5, the driven pulley (10) is illustrated in a maximum ratio position. In FIG. 4, the driven pulley (10) is illustrated in a minimum ratio, which corresponds to the final moments of the motor-braking phase when the vehicle is in the rearward rotation mode, the vehicle being almost stopped at that moment.

Initially, as the traveling speed of the decelerating vehicle is high, the winding diameter of the driven pulley (10) is small, such as in FIG. 5. The angle of the second cam surfaces (42) allows the closing force to be proportional to the resistance of movement of the driving pulley, itself coming from the resistance of movement from the motor. If the resistance increases, the movable flange (16) is biased toward the fixed flange (14) to increase the winding diameter. This also increases the tangential speed of the belt and therefore the rotation speed of the driving pulley. As the rotation speed of the driving pulley increases, its winding diameter also increases. An equilibrium is eventually reached between both pulleys. Thereafter, as the speed of the decelerating vehicle decreases, the rotation speed of the driving pulley also decreases and its winding diameter decreases, allowing in its turn the winding diameter of the driven pulley (10) to increase.

Advantages of the Present Invention

This driven pulley (10) according to the present invention suitably and efficiently operates in both forward or rearward directions, regardless if the vehicle accelerates or decelerates.

Another advantage is that the cam followers (28,46) remain constantly in engagement with the cam surfaces (24,42), which is a very important advantage to prevent knocks or when used in a special driven pulley that has small balls between opposite cam surfaces since these balls need to be in a constant engagement from both sides. Moreover, the driven pulley (10) can be designed so that the CVT provides a substantially constant motor rotation speed during motor braking phases, which is particularly desirable in the case of a regenerative electric motor since it facilitates the voltage regulation to store electrical power back into the batteries of the vehicle.

Further, when the driven pulley (10) is used with an electric motor with regenerative capabilities, the driven pulley (10) may be designed to rotate the motor faster during regeneration than it would when the motor drives the vehicle. This compensates for the loss of efficiency of the motor when used as a generator.

Other Alternative Embodiments

The first (24) and second cam surfaces (42) may be formed by a set of independent elements that are not part of an annular element. The angles of the first (24) and second cam surfaces (42) are not necessarily identical. Also, the cam surfaces (24,42) are not necessarily straight.

The invention is not limited to the described embodiments and encompasses any alternative embodiments within the limits defined by the claims.

What is claimed is:

1. A driven pulley for use in a continuously variable transmission, the driven pulley being coaxially mountable around a main shaft and comprising:

a first flange having a conical wall on one side thereof;

a second flange coaxial with the first flange and having a conical wall which faces the conical wall of the first flange to form a belt-receiving groove in which a belt is to be partially wound, the second flange being at least axially movable with reference to the first flange;

a first annular cam plate comprising at least two inclined first cam surfaces that are substantially identical and symmetrically-disposed thereon;

a set of at least two first cam followers, each first cam follower being in engagement with a respective one of the first cam surfaces;

a first radial support coaxial with the first and the second flange, the first support being axially movable and pivotable with reference to the first flange;

a second annular cam plate comprising at least two inclined second cam surfaces that are substantially identical and symmetrically-disposed thereon, the second cam surfaces having an inverted inclination with reference to the first cam surfaces;

a set of at least two second cam followers, each second cam follower being in engagement with a respective one of the second cam surfaces;

a second radial support coaxial with the first and the second flange, the second support being rigidly connectable to the main shaft;

a first spring set between the second flange and the first support; and a second spring set between the first support and the second support;

wherein one among the first cam plate and the set of first cam followers is mounted on the second flange and the other is mounted on the first support, and wherein one among the second cam plate and the set of second cam followers is mounted on the first support and the other is mounted on the second radial support.

2. A driven pulley according to claim 1, wherein the first cam surfaces, the first cam followers, the second cam surfaces and the second cam followers are each three in number.

3. A driven pulley according to claim 1, wherein the first flange is fixed in rotation and in translation with reference to the second support.

4. A driven pulley according to claim 3, wherein the first flange is rigidly connected to the main shaft.

5. A driven pulley according to claim 1, wherein the first cam followers and the second cam followers are slider buttons.

6. A driven pulley according to claim 5, wherein the slider buttons are grouped in pairs, each pair comprising a first cam follower and a second cam follower that are coplanar in a radial plane.

7. A driven pulley according to claim 1, wherein the first cam followers and the second cam followers are rollers.

8. A driven pulley according to claim 7, wherein the rollers are grouped in pairs, each pair comprising a first roller as a first cam follower and a second roller as a second cam follower, the first and second rollers of each pair being mounted around a same radially-projecting axle.

9. A driven pulley according to claim 1, wherein the first and the second cam plates have a substantially identical diameter.

* * * * *